L. A. LAURSEN.
FLUID OPERATED GEAR SHIFTING MECHANISM.
APPLICATION FILED FEB. 19, 1917.

1,280,770.

Patented Oct. 8, 1918.
7 SHEETS—SHEET 7.

UNITED STATES PATENT OFFICE.

LAURITS A. LAURSEN, OF CORNELL, WISCONSIN, ASSIGNOR TO UNITED STATES AUTO GEAR SHIFT COMPANY, OF EAU CLAIRE, WISCONSIN.

FLUID-OPERATED GEAR-SHIFTING MECHANISM.

1,280,770.   Specification of Letters Patent.   Patented Oct. 8, 1918.

Application filed February 19, 1917.   Serial No. 149,707.

*To all whom it may concern:*

Be it known that I, LAURITS A. LAURSEN, a citizen of the United States, residing at Cornell, in the county of Chippewa and State of Wisconsin, have invented certain new and useful Improvements in Fluid-Operated Gear-Shifting Mechanism, of which the following is a specification.

This invention has to do particularly with improvements in control mechanisms for transmission gearing such as utilized for automobiles and other machines. The invention involves a fluid operated type of control mechanism including primarily peculiar selecting instrumentalities for establishing different gear relations as regards their use for variable speed transmission control, or for establishing different selective relations between other parts. In addition to the selecting instrumentalities which in my invention comprise preferably a plurality of selecting cylinders and pistons operating therein, I utilize peculiar operating mechanism involving a manual actuator associated with motors in the form of pistons operating in suitable cylinders and capable of moving an incompressible fluid pressure medium, said pressure medium being selectively directed so as to act upon certain of the various selecting instrumentalities or pistons whereby to differentially actuate a shifting rod or member. The shifting rod or member in turn is connected so as to control the establishment of different gear relations as to transmission gearing coöperation or the establishment of different relations of other parts where the invention may be employed for purposes other than in association with transmission gearing.

In addition to the foregoing features, my invention involves the provision of peculiar selecting means manually controllable for variable selection of a plurality of motor devices or pistons such as above referred to; other selecting mechanism in the specific form of a peculiar valve governing the direction of flow of a fluid pressure medium; provisions for the actuation of both of the selecting means just mentioned by a common control device, together with other features of construction which will be more fully presented in the accompanying description in connection with the annexed drawings, in which—

Fig. 8 is a bottom plan view of the selector valve;

Fig. 9 is a sectional view broken away showing the selector valve in position in its valve casing, the valve likewise being partly broken away;

Fig. 10 is a detail of the control lever and associated indicating sector or quadrant.

General arrangement of parts.

Figure 1:
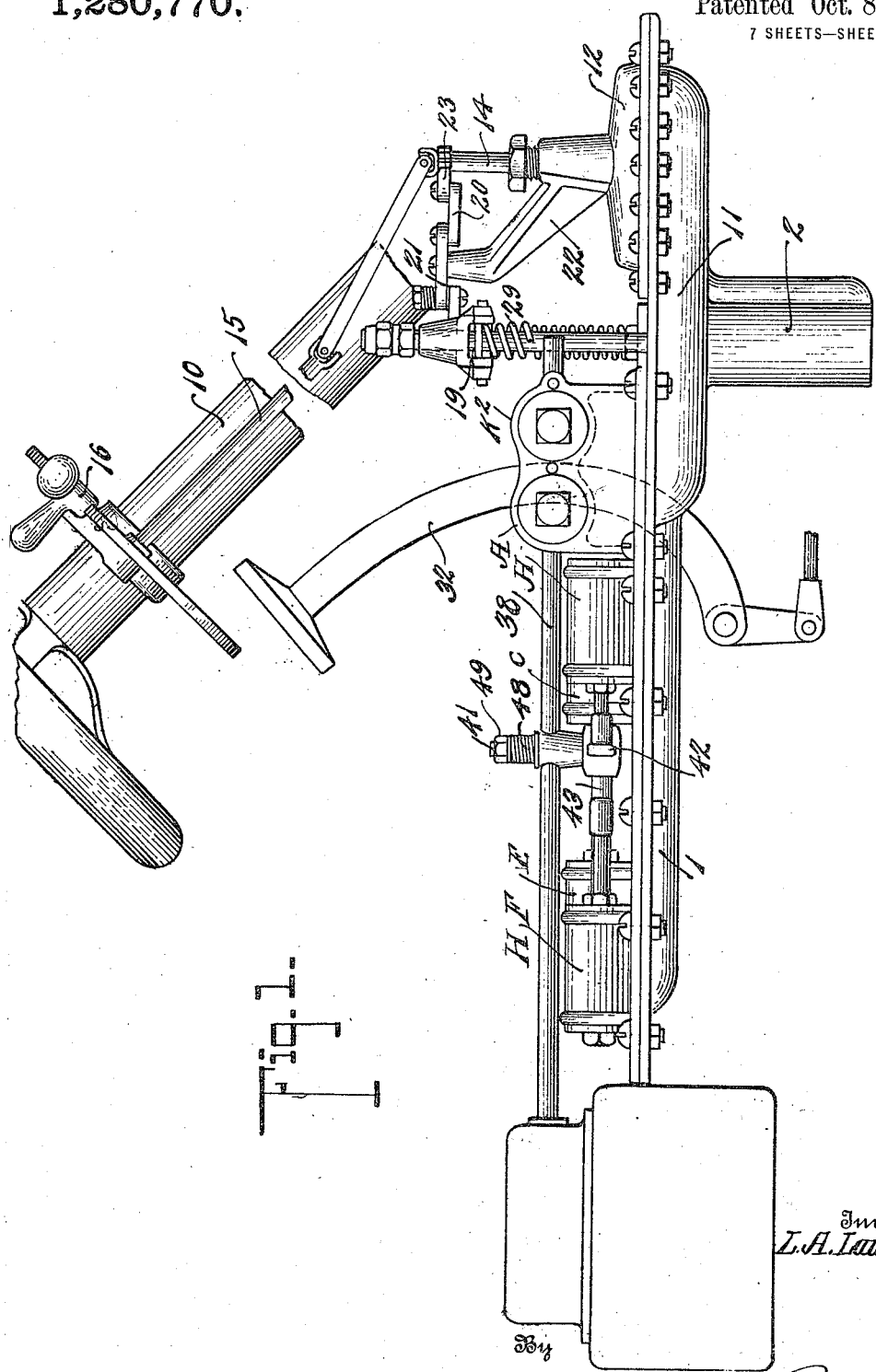
Figure 1 is a side elevation of hydraulic gear shifting mechanism made in accordance with the invention and arranged adjacent to the steering column of a motor vehicle, the latter being broken away.
Figure 2:
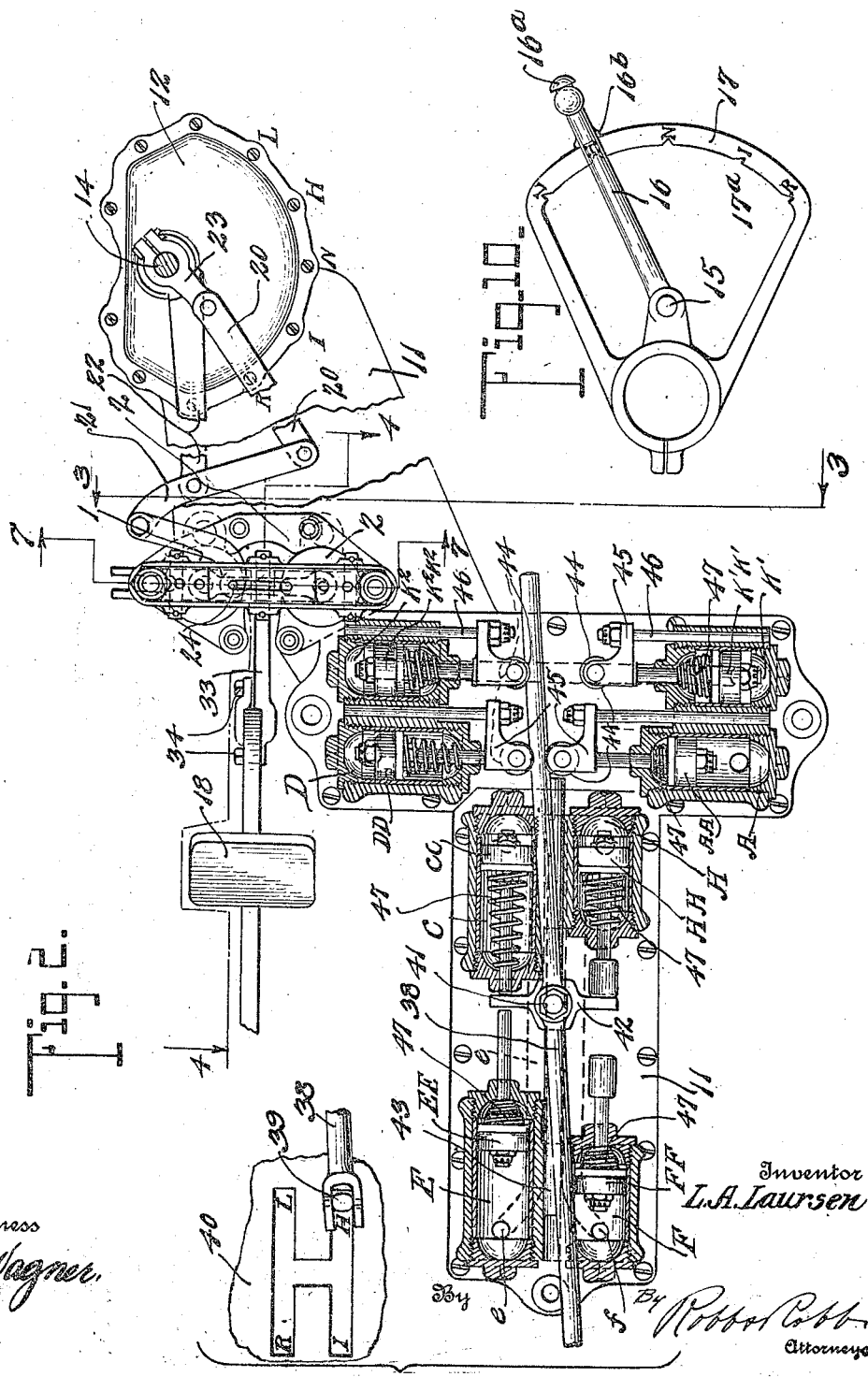
Fig. 2 is a partial top plan view and partial horizontal section illustrative of the general arrangement of the selecting and actuating pistons, the selector valve casing, the clutch lever and certain operative connections.

As will be seen on reference to Figs. 1 and 2 of the drawings particularly, the hydraulic gear shifting means of this invention is associated with the steering column 10 of a motor vehicle, but it is to be understood, of course, that the usefulness of the invention as a gear shifting means for variable speed transmissions is not limited by any means to motor vehicles.

As the invention is presented in the embodiment described hereinafter it is applicable to any type of four speed transmission involving the usual three forward speeds and the reverse. Furthermore, as will be understood from the aftergoing description, the gear shifting mechanism may be said to be a combination of the selective and progressive types, the progressive phase of action being incident primarily to the provision of the semi-automatic hydraulic actuating means.

Adjacent to the base of the steering column 10 is located a casing 11 provided at its front portion with a valve chamber 12 in which operates a controlling or selector valve 13 (see Fig. 9). The casing 11 extends rearwardly quite a distance from the chamber 12 and there are provided in said casing a series of conduits or passages leading from ports communicating with the valve chamber 12, to a corresponding series of selecting cylinders F, E, H, C, D, $K^2$, $K^1$ and A. These cylinders are shown in section in Fig. 2 and the arrangement of the conduits disclosed by dotted lines in Figs. 5 and 6. The casing 11 is likewise provided with conduits connecting the valve chamber 12 with two cylinders 1 and 2, vertically disposed as distinguished from the cylinders above mentioned which are horizontally disposed, see Figs. 2 and 4. The cylinders 1 and 2 will be termed motor cylinders for the purposes of this description and the various conduits will be designated and referred to more fully hereinafter.

The hydraulic medium employed for the purposes of the invention is preferably liquid oil of comparatively light specific gravity. While the pressure medium employed is a liquid or oil, the principle of the invention may be carried out by the employment of some other kind of pressure medium and I therefore use the term "oil" hereinafter in that breadth of sense inclusive of other pressure mediums.

The selector valve 13 has a stem 14 extending exterior to the casing 11, said stem being connected by suitable linkage and universal joints to a control shaft 15 on the steering column 10. The control shaft 15 has at its upper end, see Fig. 10, an operating arm or lever 16 movable adjacent to the indicating sector 17, the latter having the indicia "R, I, N, H, L" thereon to facilitate movement of the lever 16 to positions controlling reverse, intermediate, neutral, high and low gear relation positions.

Figure 3:
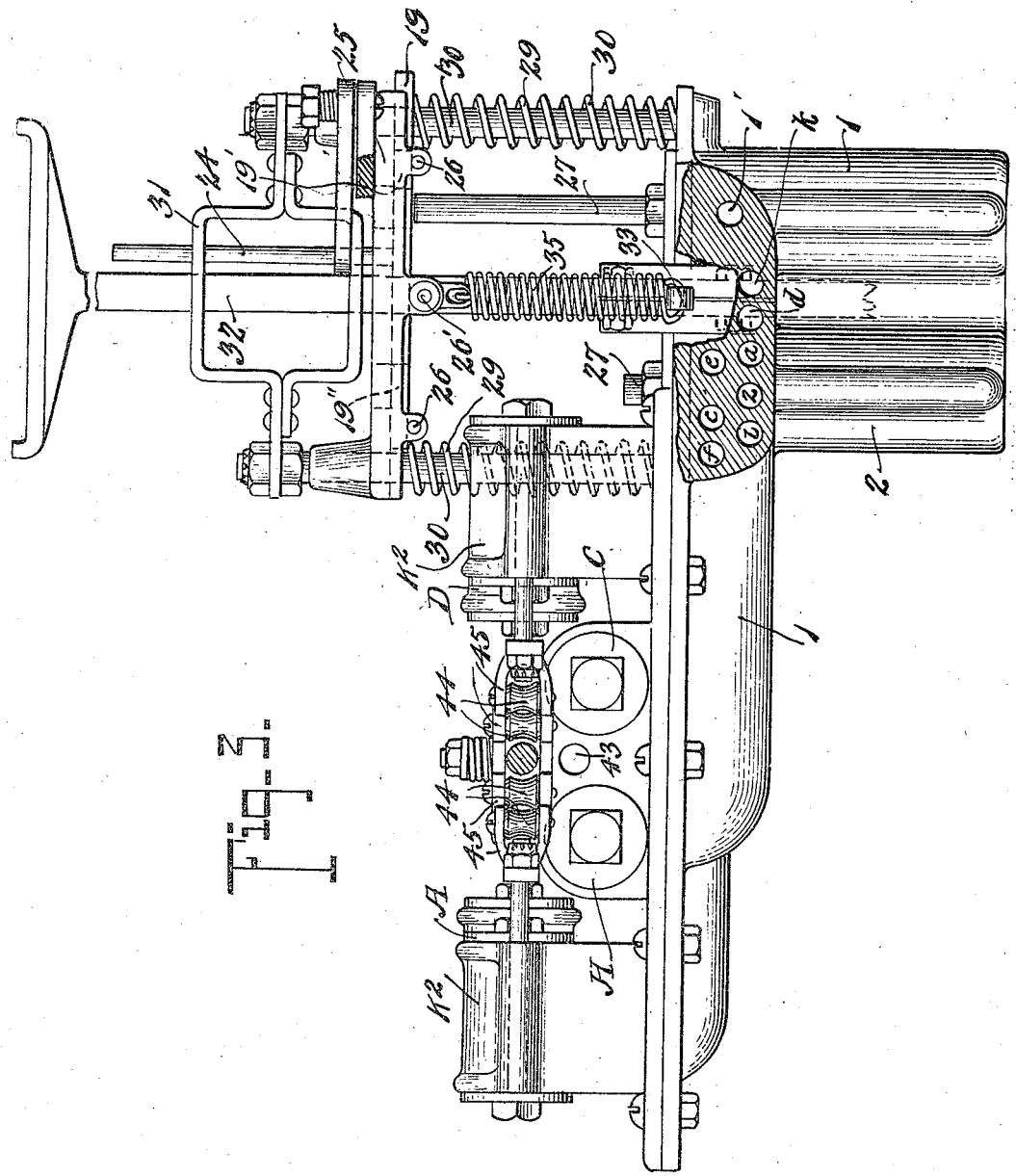
Fig. 3 is a front view of the mechanism, a portion of the casing being broken away and shown in section on the line 3—3 of Fig. 2 to show certain of the oil conduits leading from the valve casing to the selecting cylinders.
Figure 4:
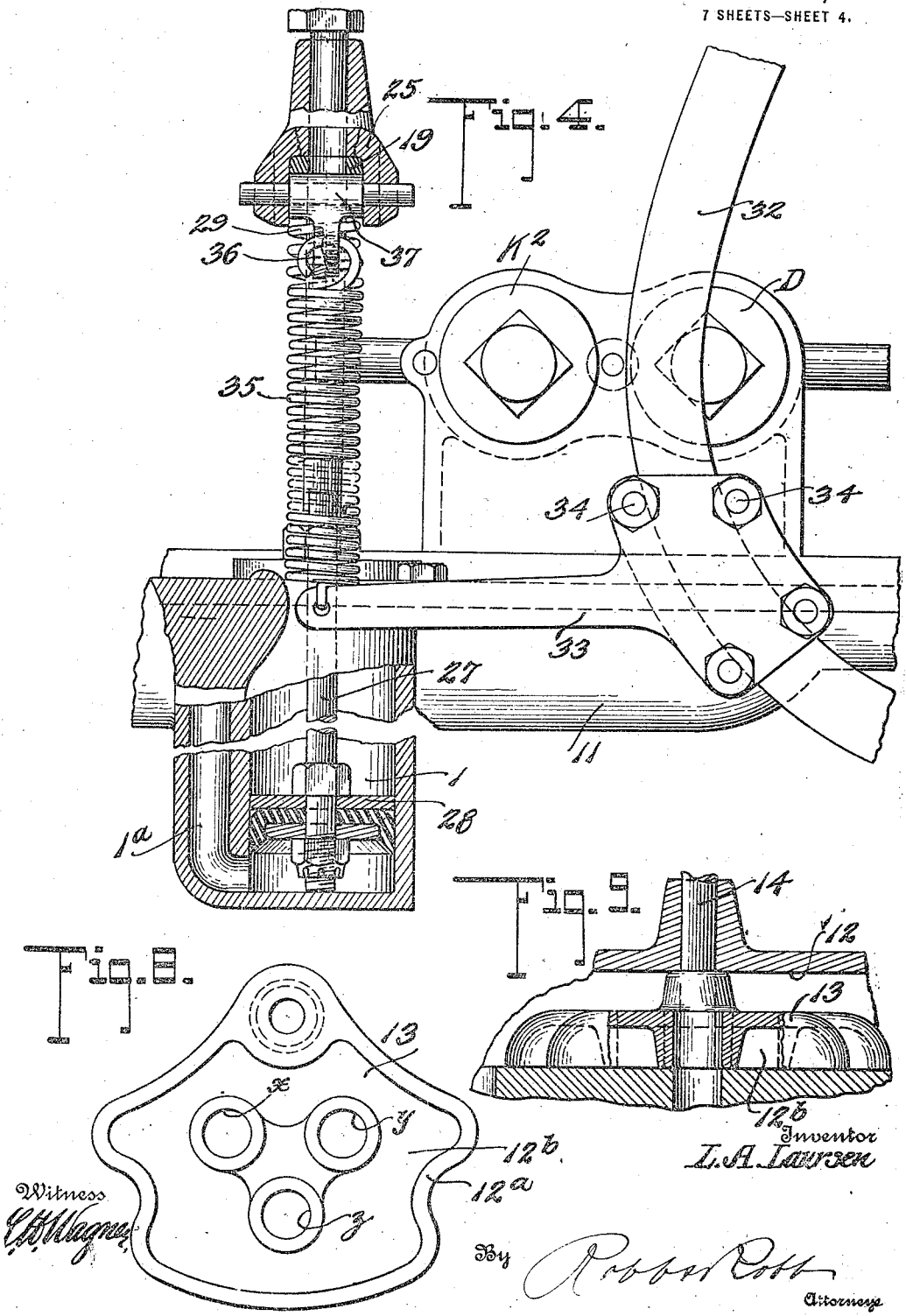
Fig. 4 is a vertical sectional view taken approximately on the line 4—4 of Fig. 2.

In addition to being adapted to operate the selector valve 13, the control shaft 15 is operatively connected with a motor cylinder selector in the form of a slide 19, see Figs. 3 and 4. For this purpose certain links 20 and a lever 21 pivoted to a bracket 22 connect an arm 23 on the valve stem 14 with a post 24 projecting upward from the selector slide 19. The said links and levers are so arranged that on turning the shaft 15 one or the other, or both of the pistons in the cylinders 1 and 2 will be rendered operable by movement of the slide 19.

The slide 19 is peculiarly mounted, being supported for horizontal sliding movement on the under side of a cross head 25, Figs. 3 and 4, by means of horizontal pins 26 supported by depending lugs on the cross head. Said slide 19 has two openings 19' and 19" vertically therethrough, each of which openings is adapted to register with an adjacent one of the piston rods 27 of the piston 28 located in the cylinders 1 and 2, and both of which openings 19' and 19" are susceptible of being positioned by movement of the slide 19 so as not to register with their respective coöperating rods 27.

The cross head 25 is normally held up in the position of Fig. 3 by coiled springs 29 interposed between the cross head and the casing 11, said springs surrounding guide and supporting rods 30 which pass through the cross head 25 at its ends. Said rods 30 are connected at their upper ends by a yoke 31 through which yoke the post 24 passes, the latter acting as a guiding means to assist in maintaining the slide 19 and cross head 25 horizontal on depressing movement of the cross head with the slide. Likewise the post 24 as an elongated member, notwithstanding raising and lowering movement of the member 19 operates through the opening in the connecting link 20 so as to maintain an active connection always between the link 20, and consequently the shaft 15 and stem 14, and the slide 19.

As viewed in Fig. 3, the slide 19 is adjusted with its opening 19' to the left of the right hand piston rod 27 so that upon depression of the slide with its cross head 25 abutment of the slide 19 with the upper end of the rod 27 will force the piston 28 of the cylinder 1 in a downward direction, see Fig. 4. Oil in the lower portion of such cylinder 1 would under these conditions be forced out of the cylinder through a conduit $1^a$ into the valve chamber 12.

The clutch lever 32, or any equivalent means employed to control the driving connection between the engine and the machine or vehicle, is utilized for operating the cross head 25 and thereafter the pistons 28 of the motor cylinders 1 and 2, owing to the provision of the following connecting instrumentalities. Referring to Figs. 1 and 4 especially, it will be observed that there offstands from the clutch lever 32 an arm 33 clamped on the lever 32 by bolt and nut connections 34. The arm 33 is attached at its outer end to the lower end of a coiled spring 35, the upper end of which spring is engaged in a slot 36 of a coupling member 37 connected with the cross head 25 by the pin 26'. Thus it is that a connection 35 is established intermediate the clutch lever 32 and the cross head 25 with its selector 19 which connection permits of a slight preliminary movement of the clutch lever 32 to dis-establish the driving connection afforded by the clutch (not shown) and thereafter additional or subsequent movement of the lever 32 will cause downward movement of the cross head 25. Should it be that during said subsequent movement of the lever 32 causing the lowering of the selector 19, the selector engages one or the other of the rods 27, the corresponding piston 28 will be actuated to force the oil from its cylinder through the passage $1^a$ or $2^a$, as the case may be, to the valve chamber 12. A previous adjustment of the selector valve 13 simultaneously with the adjustment of the motor cylinder selector 19 controls the manner in which the oil or pressure medium is circulated in the conduits to be later described and caused to act upon the pistons in the selector cylinders previously mentioned, whereby to effect shifting of the gear connections of the transmission, all of which will be set forth fully hereinafter.

The transmission mechanism with which the invention is used is of the four speed type, as previously suggested, and the only details of said mechanism illustrated are seen best in Figs. 1 and 2 of the drawings, and comprise the gear shifting rod 38, one end of which is adapted to be connected with the ordinary hand gear shifting lever provided for automobile transmissions and designated 39 in the conventional illustration thereof in Fig. 2. There is associated with the lever 39, of course, the customary guide plate 40 by which the movement of the lever is compelled in certain directions in order to obtain the four possible speeds in establishing driving gear relations and in bringing the lever 39 to a neutral position. The gear shifting rod 38 is pivotally supported at 41 upon a cross piece 42 carried by a guide rod 43, the latter sliding in suitable guide openings in a member of the casing 11. Under these conditions the shifting rod 38 is susceptible of longitudinal movement at its front end as well as lateral movement incidental to pivoting on the pivot 41, as required to place the lever 39 in any one of its customary five adjustments for gear relation purposes. The cross piece 42 is arranged so that it may be engaged by the outer ends of the rods of the pistons E—E, F—F, C—C, H—H of the respective cylinders F, E, C and H. The pistons just mentioned therefore control the longitudinal movement of the gear shifting rod 38. In a somewhat analogous manner, lateral movement of the rod 38 is controlled by the pistons D—D, $K^2$—$K^2$, A—A and $K^1$—$K^1$ in the cylinders D, $K^2$, A and $K^1$, respectively. For this purpose the rods of the pistons last mentioned are provided with abutting means in the form of rollers 44 adapted to engage with opposite sides of the rod 38 to shift the rod laterally, said rollers 44 being carried by guiding arms 45 having the rods 46 connected therewith and operating in suitable guide openings adjacent the cylinders, the parts 45 and 46 holding the rollers 44 in horizontal positions to insure their proper abutment with the shifting rod 38.

There are provided in all of the various cylinders F, E, C, H, D, A, $K^1$ and $K^2$, light coiled springs 47 interposed between the pistons of these cylinders and the ends of the cylinders, on the sides of the pistons opposite those subjected to the action of the pressure medium. The purpose of these springs 47 is to move the pistons in a direction for expelling the oil pressure medium from the respective cylinders, after a gear shifting operation has been performed.

To prevent undue looseness of the connection at the pivot 41 a coiled spring 48 is caused to frictionally engage the rod 47 and held in place by a nut 49, see Fig. 1.

*Oil distributing conduits.*

The operation of the gear shifting means of this invention is of course dependent primarily upon the mode in which the oil or pressure medium is distributed to the various selecting cylinders under pressure caused by movement of the pistons in the motor cylinders 1 and 2. The distribution in turn is governed, of course, by the arrangement of the conduits or passages in the casing 11 connecting the valve chamber 12 with the selecting cylinders and the valve chamber 12 with the motor cylinders; also governed by the arrangement of ports in the valve 13 and the peculiar formation of said valves.

Figure 5:
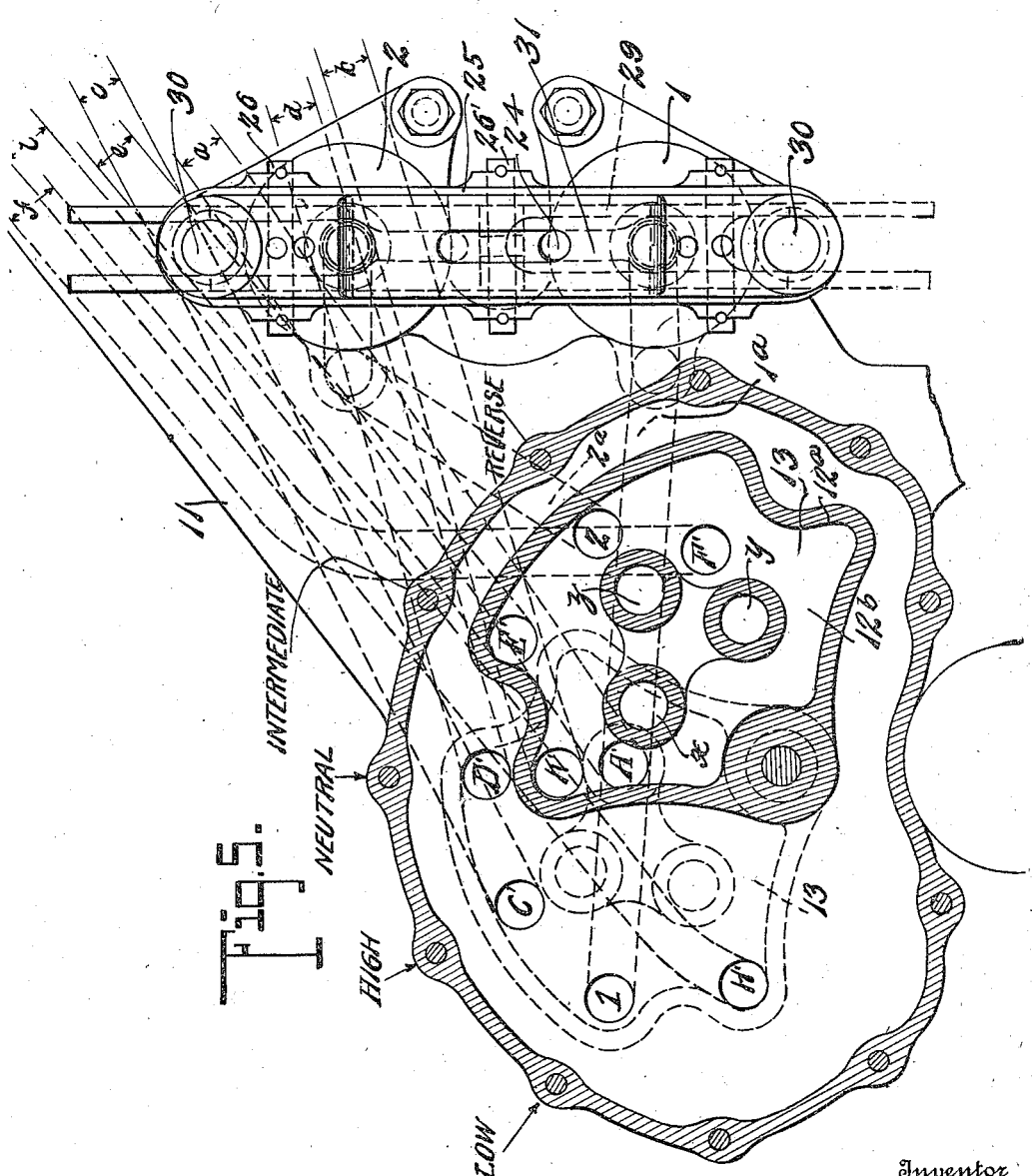
Fig. 5 is a horizontal sectional view taken through the selector valve casing, dotted lines showing the relative location and direction of the oil conduits connecting the valve casing with the selecting cylinders.
Figure 6:
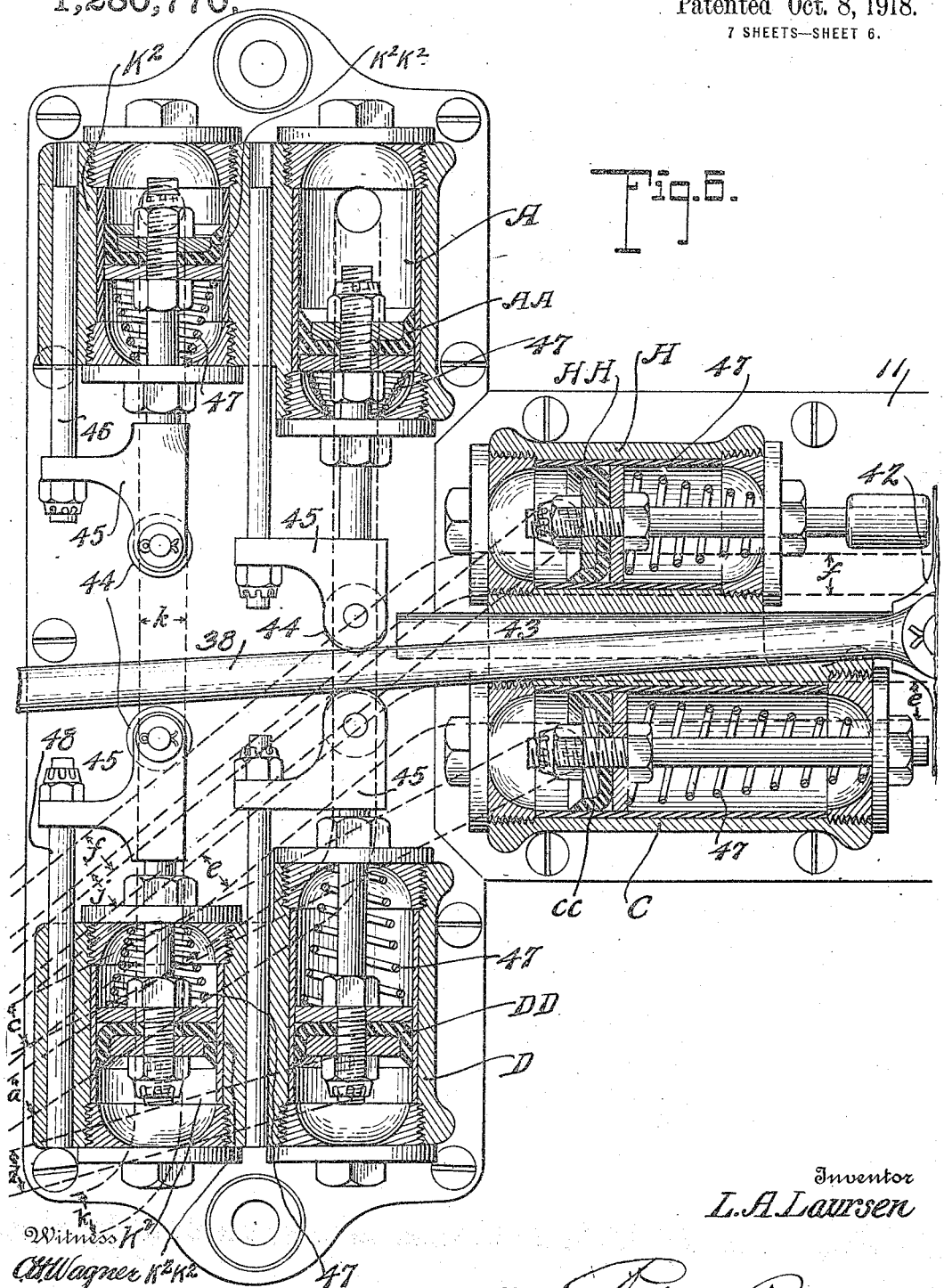
Fig. 6 is a sectional view of the selecting cylinders showing the pistons thereof and means whereby said pistons are enabled to coöperate with the gear shifting rod, dotted lines showing the location and direction of the oil conduits leading to said cylinders, and said dotted lines being virtually an extension of the same dotted line conduits illustrated in Fig. 5.
Figure 7:
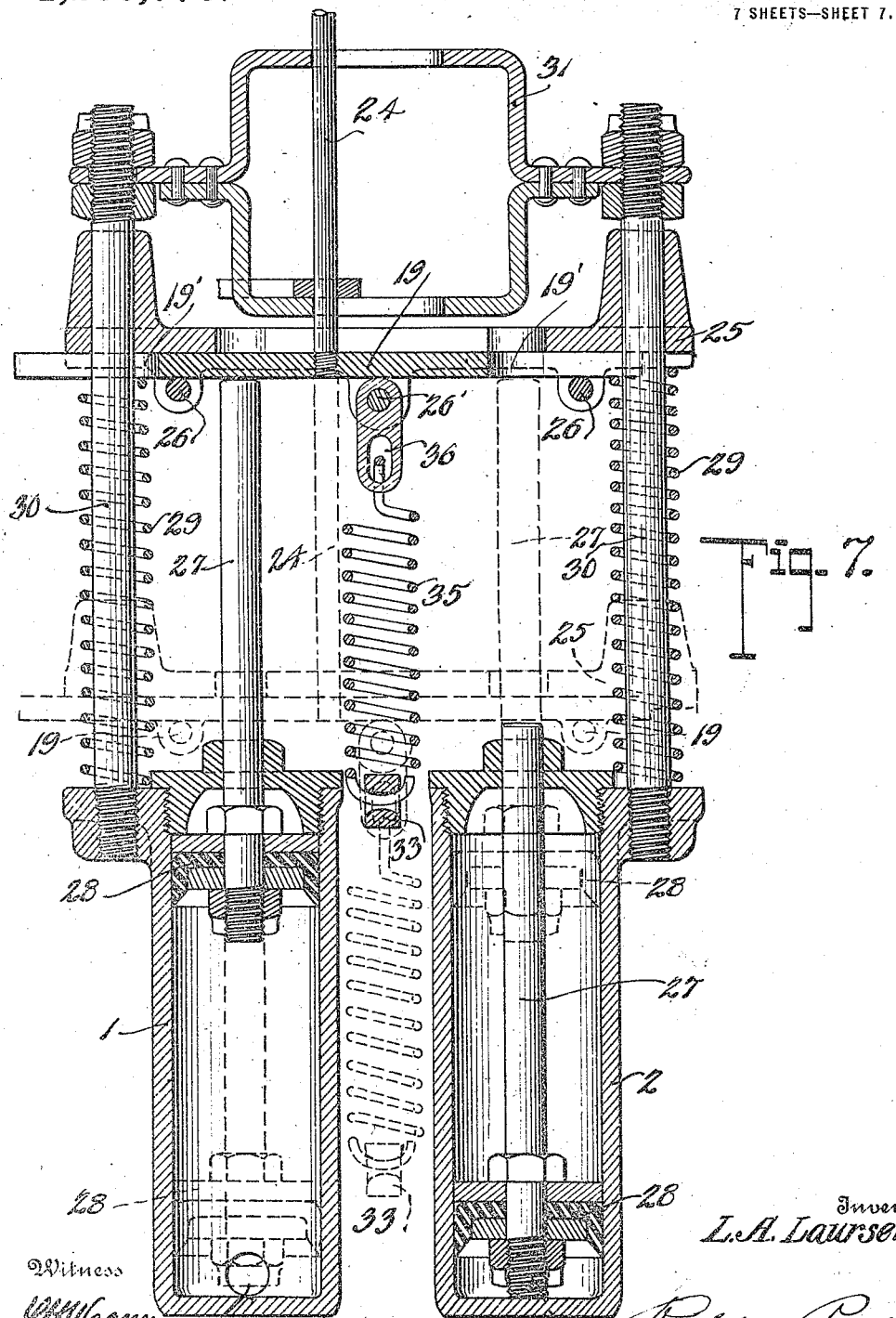
Fig. 7 is a sectional view taken about on the line 7—7 of Fig. 2.

Taking up now the arrangement of the conduits, reference is made particularly to Figs. 2, 5 and 6.

Referring to the conduits and beginning at the left hand end of Fig. 2, it will be observed that a conduit $e$ leads from the cylinder E past the cylinder C to the port E' of chamber 12. Likewise conduit $f$ leads from the cylinder F past the cylinder H to the port F' of chamber 12. The other cylinders are connected likewise as follows: Cylinder C by conduit $c$ to port C'; cylinder H by conduit $h$ to port H'; cylinder D by conduit $d$ to port D'; cylinder A by conduit $a$ to port A'; from port $K^1$ of chamber 12 the conduit $k$ leads to the cylinder $K^2$ and then on to the cylinder $K^1$, said conduit $k$ being the only one of these conduits leading to two cylinders. As evident from Fig. 3, some of the conduits just mentioned are located above others, being suitably formed, of course, in the casting which forms a part of the casing 11.

Conduits $1^a$ and $2^a$ have already been described as connecting the valve chamber 12 with the lower ends of the motor cylinders 1 and 2 respectively, leading to said cylinders in the manner fully shown in Fig. 4.

*Selector valve construction.*

A proper understanding of the flow of oil in the distributing conduits aforesaid depends upon a comprehension of the peculiar formation of the selector valve 13 employed by me and seen best in Figs. 8, 9 and 5. This selector valve is approximately flat on its upper side and formed with an edge flange 12$^a$ providing an auxiliary valve chamber 12$^b$ within the valve itself, see Fig. 9. The edge flange 12$^a$ seats closely on the bottom of the main valve chamber 12 and at the central portion of the body of the valve 13 are provided the ports $x$, $y$ and $z$, said ports comprising openings extending through the valve body and formed by the provision of tubular bases extending from the top of the valve down to the bottom of the valve chamber 12.

The formation of the valve 13 and the arrangement of the ports $x$, $y$, $z$, together with the formation of the hollow portion of the valve are such that under certain conditions the main valve chamber 12 may be divided into two operating oil spaces, so to speak, one of which spaces namely that called the auxiliary valve chamber 12$^b$, causes an intercommunication of various of the ports leading into the bottom of the valve chamber 12 and one of the motor cylinders, while the other space, above the valve 13, establishes a communication between the other motor cylinder and other of the ports in the bottom of said valve chamber 12. There are other relations established as regards the parts and ports just mentioned but which will be more clear on reference to the general description of the operation of the mechanism found hereinafter.

*General operation of mechanism.*

Bearing in mind that the primary control of the hydraulic gear shifting means of the invention is adjacent to the steering wheel, whenever the operator desires to shift he will, of course, move the lever 16 to a properly designated position with respect to the sector 17, see Fig. 10. This action of the lever 16 does two things simultaneously, namely—causes movement of the selector valve 13 to a position to control the passage of the oil in a certain manner through the conduits to act upon the pistons in the selecting cylinders; also the movement of the motor cylinder selector slide 19 to either a neutral position wherein it will coöperate with both pistons 28 of the motor cylinders, or into a gear connection position wherein it will coöperate with the piston 28 of one of the cylinders only. We will assume for the present that the simultaneous adjustment of the parts above mentioned properly adjusts the valve 13 and positions the selector 19 so that one of its openings is opposite the rod 27 of one of the motor pistons 28 while the other opening 19′ does not register with the other rod 27.

To shift the gears the operator depresses the clutch pedal 32 which acts in the customary manner to interrupt the driving connection between the engine and the drive shaft of the machine. The foregoing is accomplished in the preliminary movement of the clutch lever 32, say during its movement of about one and one-half to two inches from normal position. Such movement is permitted through movement of the cross head 25 owing to the slot connection 36 of the spring 35 with the cross head, see Fig. 4. Continued movement downward of the lever 32 expands the spring 35, energizing the same, so to speak, and thereafter the cross head 25 is pulled downward by said spring while the lever 32 is held depressed, thereby causing the selector member 19 to abut with the piston rod 27 of the selected piston 28 of one of the motor cylinders 1 and 2, forcing said selected piston downward in its cylinder and causing the oil in the cylinder to be expelled therefrom into the valve chamber 12. The valve chamber 12 being divided, of course, by the adjustment of the valve 13 into two oil spaces, one within the valve and the other exterior to the valve, as some of the oil enters the chamber from the particular motor cylinder whose piston is depressed, other of the oil passes to and enters the other motor cylinder raising its piston if need be, and still other of the oil being directed through the various conduits so as to pass into certain of the selecting cylinders F, E, C, H, D, A, K$^1$ and K$^2$ and out of other of the cylinders depending upon the particular selection effected by the valve 13 and the selector 19.

To exemplify the above operation with specific instances of the establishment of certain gear connections, reference is had to Fig. 2 wherein the pistons of the cylinders E, F, A and K$^1$ may be said to have been operated by oil entering said cylinders. The valve 13 under this particular condition is adjusted as seen in dotted lines in Fig. 5 so that the ports 2′, E′, and F′ are uncovered by the valve and the port A′ is in communication with the port $x$ which goes through the valve itself, see Fig. 8. Thus the oil will pass from the motor cylinder 2 which was selected in this particular case, through port 2′ up over the valve 13 down through the port A′ of said valve. At the same time the hollow space beneath the valve 13 connects the several ports K$^1$, D′, C′ and H′, and likewise the conduit 1′ leading to the motor cylinder 1, and the oil by this arrangement of the valve is exhausted from the cylinder 2 and enters the cylinder 1, the piston rod of the cylinder 2 being in abutment with the cylinder slide 19 and the piston rod of the cylinder 1 being free to move upward through a registering opening 19' of said selector. The movement of the pistons of the selecting cylinders as just set forth causes a shifting of the gear rod 38 to establish what is known as the high speed driving connection. To make this a little more clear, Fig. 2 may be again referred to in connection with the guide plate 40. The admission of the oil to the cylinders E and F with the simultaneous exhaustion of the oil from the cylinders C and H effects longitudinal movement of the rod 38 toward the right.

The admission of the oil into the cylinders A and K¹ and exhaustion of the oil from the cylinders D and K² causes the rollers 44 of piston A—A to exert a pressure laterally on the right hand end of the rod 38 as said rod moves to the right longitudinally in shifting to high. If it happens that the lever 39 is in the upper length of the slot of the guide plate 40, as if the shift is from low going to high, obviously the piston A—A will not be effective to cause lateral movement of the rod 38 until the lever 39 is opposite the cross slot of the guide plate at which time the pressure on the piston A—A becomes effective to shift the lever 39 over, the pressure on the pistons in cylinders E and F being momentarily opposed and thereafter acting to shift the lever 39 with the rod 38 as soon as the lever 39 gets into the lower length of the guide slot as seen in Fig. 2.

In the full line position of the valve 13 shown in Fig. 5 said valve is adjusted for the establishment of reverse driving relation of the gears of the transmission. On Fig. 5 furthermore are certain indicia marks "Reverse", "Inter" (for intermediate) "Neutral", "High" and "Low", and positioning of the valve 13 with a center line therethrough registering with the indicia marks just above mentioned will result, with the coöperation of the selector 19 adjusted to actuate the proper piston 28, or both of them, in obtaining the particular speed desired.

A gear relation once established by this shifting mechanism may be disestablished and a new one set up by the mere preliminary movement of the clutch lever 32 subsequent to the adjustment of the control lever 16, which disconnects the engine from the drive shaft, and thereafter additional movement of the lever 32 causes the actual shifting to take place by movement of the oil into and out of certain selecting cylinders and into and out of the motor cylinders.

The following table indicates just which cylinders are selected for the purpose of causing the oil to exert a pressure against the working sides of the pistons in said cylinders when different driving gear relations, and the neutral position of the transmission gearing are required to be obtained.

| Gear relation. | Motor cylinder. | Working selecting cylinder. |
| --- | --- | --- |
| L | 2 | D E F |
| H | 2 | E F A |
| N | 2 | I.H. F K |
| R | 1 | D C H |
| I | 1 | H A C |

In connection with the above table it is to be understood of course that the cylinders designated are the oil receiving cylinders, the opposing cylinders, of course, not being denoted though it may be said that the oil will exhaust from the latter cylinders.

It is desirable to describe the special action incident to shifting of the gears to neutral. It may be noted that the quantity of oil used for the purposes of my mechanism herein described is such that at a predetermined adjustment of the parts the cylinders E, F, H, C, A, D, K¹ and K² are empty, the several springs in said cylinders holding the pistons thereof at one extreme of movement. The balance of the oil containing portions of the mechanism, such as the passages leading to the cylinders, the valve chamber 12, cylinders 1 and 2, etc., are filled with the oil. For this operation the lever 16, Fig. 10, is of course shifted to the N designation on the sector 17. By this action the valve 13 and the motor cylinder selector 19 are adjusted so that the openings 19' of the selector do not register with the piston rods 27. Depression of the cross head 25 and selector 19 by the clutch lever 32 will cause whichever piston 28 that may be up to move downward and whichever piston 28 that may be down to move upward so that the upper ends of the rods 27 will be in abutment with the selector 19 as the latter reaches approximately a point equal to half its usual movement when establishing gear connection relations. At this time the motor cylinders 1 and 2 are each half filled with oil and subsequent movement on the clutch pedal or lever 32 will expel the oil from both cylinders into the valve chamber 12. The above will be accomplished as a result of the positioning of the valve 13 such that said valve leaves the ports 2', F', 1' and H' uncovered. Likewise, practically speaking, the port K' is uncovered because it is opposite the middle port z of the valve which it will be recalled goes through the valve. Furthermore, the conduits leading from cylinders A, D, C and E are in communication at the ports A', D', C' and E' because the latter ports are beneath the valve 13 in communication with its auxiliary valve chamber 12ᵇ by the interconnections of the ports and conduits mentioned. According to the above adjustment of the valve the oil is caused to flow through the conduits in such a manner as to equalize pressures on the pistons in the various selecting cylinders so as to cause lateral or longitudinal or both such movements of the gear shifting rod 38 until said rod assumes a position with the cross piece 42 at a mid point between the extremes of its movements under the control of the pistons A—A and D—D, K¹—K¹ and K²—K². In the pressure equalization process of course some of the cylinders will partially exhaust and some will partially fill with oil, this depending upon the positions of the pistons in said cylinders effected by a previous gear shifting operation.

It should be noted additionally that when a shift has been made once it is possible to depress the clutch lever 32 as often as desired to disconnect the engine from the drive shaft, as for a quick stop, and without causing any gear shifting operation. This is due to the fact that preliminary operative movement of the lever 32 may be caused before the motor piston operating action of said member is brought into play. Owing to this feature of operation also it is possible to disconnect the clutch or drive from the engine to the engine shaft, as for making a quick stop from high speed, and while the lever 32 is held in the drive disconnecting position only, the control lever 16 is susceptible of operation to adjust the selector slide 19 for making a gear shift which in the example just mentioned may be for the purpose of going into neutral. The neutral gear relation would be, of course, accomplished by additional pressure and movement downward of the lever 32 after the movement of the lever 16.

Referring to Fig. 10 it will be observed that to prevent a shift of gear relations that might result in going into reverse by mistake, a button 16ᵃ is provided on the lever 16 for manipulation of a catch 16ᵇ on the lever which catch engages notches on the inner side of the sector 17. One of the notches 17ᵃ is so formed that before the lever 16 can be moved to reverse position the button 16ᵃ must be pressed; otherwise the lever will be stopped at intermediate speed.

It is to be observed that the gear shifting mechanism as a whole may be placed behind the transmission, in which event the operative connection between the rod 38 and the transmission devices themselves would be located at the end of the rod 38 opposite that having the connections according to the present illustration of the invention. I do not wish, therefore, to be limited to any particular arrangement of either the selecting or motor mechanisms or even the valve mechanism such as shown in my drawings, all of these being susceptible of modification depending upon the particular type of machine in connection with which the hydraulic gear shifting instrumentalities may be desired to be employed.

By way of recapitulation it is to be observed that the clutch lever 32 constitutes an actuator of the manually operable type and the lever 16 is likewise a manual controlling device governing the selections of the various gear relations of the transmission mechanism. Furthermore the spring 35 connected with the clutch lever 32 is obviously an energy storing device, the expansion of the spring suddenly by the downward movement of the lever 32 storing up sufficient energy in the spring to cause it to perform the work required, namely the operation of one or both of the motor pistons. The members 19 and 13 are respectively motor piston and selecting piston selecting devices and are synchronously operable as set forth. It is obvious that the lever 32 need not necessarily be a clutch, or driving connection controlling lever or actuator, since the invention would be susceptible of embodiment by the use of a lever equivalent to the lever 32 excepting devoid of the driving connection actuating function of said lever. The principle of operation of the selecting instrumentalities employed in this invention may be utilized for other selection purposes than establishment of different gear relations of a transmission mechanism and I desire that my claims for my invention be interpreted with the foregoing recognition of the scope of usefulness of my device.

Having thus described my invention, what I claim as new is:—

1. In mechanism of the class described, the combination of a gear relation control member, selecting mechanism for causing operation of said control member and including selecting pistons, a selector valve controlling the passage of a pressure medium to said pistons, motor devices for causing movement of the pressure medium to act upon said pistons as selectively controlled by the selector valve, means for setting the selector valve for a selective operation of said control member, and means for selecting one or the other of said motor devices for operation.

2. In mechanism of the class described, the combination of a gear relation control member, selecting mechanism for causing operation of said control member and including selecting pistons, a selector valve controlling the passage of a pressure medium to said piston, motor devices for causing movement of the pressure medium to act upon said pistons as selectively controlled by the selector valve, and means for setting the selector valve for a selective operation of said control member and for simultaneously selecting one or the other of said motor devices for operation.

3. In mechanism of the class described, the combination of a gear relation control member, selecting mechanism for causing operation of said control member and including selecting pistons, a selector valve controlling the passage of a pressure medium to said pistons, motor devices for causing movement of the pressure medium to act upon said piston as selectively controlled by the selector valve, and means for setting the selector valve for a selective operation of said control member and for simultaneously selecting one or the other or both of the motor devices for operation.

4. In mechanism of the class described, the combination of a gear relation control member, selecting mechanism for causing operation of said control member and including selecting pistons, a selector valve controlling the passage of a pressure medium to said pistons, motor devices for causing movement of the pressure medium to act upon said pistons as selectively controlled by the selector valve, means for setting the selector valve for a selective operation of said control member, means for selecting one or the other of said motor devices for operation, and a manual actuator for operating the motor devices.

5. In mechanism of the class described, the combination of a gear relation control member, selecting mechanism for causing operation of said control member and including selecting pistons, a selector valve controlling the passage of a pressure medium to said pistons, motor devices for causing movement of the pressure medium to act upon said pistons as selectively controlled by the selector valve, means for setting the selector valve for a selective operation of said control member, means for selecting one or the other of said motor devices for operation, a manual actuator for operating the motor devices, and a clutch controlled by said manual actuator.

6. In mechanism of the class described, the combination of a gear relation control member, selecting mechanism for causing operation of said member including a plurality of selecting pistons, a valve chamber and a selector valve therein, a casing having conduits for conducting and exhausting a pressure medium adapted to act upon the selecting pistons and which conduits communicate with the valve chamber, motor pistons, conduits connected with the valve chamber for conducting and exhausting the pressure medium when subjected to the action of said motor pistons, means for operating the motor pistons to cause the pressure medium to operate the selecting pistons under the control of said selector valve, and means for setting the selector valve.

7. In mechanism of the class described, the combination of a gear relation control member, selecting mechanism for causing operation of said member including a plurality of selecting pistons, a valve chamber and a selector valve therein, a casing having conduits for conducting and exhausting a pressure medium adapted to act upon the selecting pistons and which conduits communicate with the valve chamber, motor pistons, conduits connected with the valve chamber for conducting and exhausting the pressure medium when subjected to the action of said motor pistons, common means for setting the selector valve and for selecting one or more of the motor pistons for operation, and means for operating the motor pistons.

8. In mechanism of the class described, the combination of a gear relation control member, selecting mechanism for causing operation of said member including a plurality of selecting pistons, a valve chamber and a selector valve therein, a casing having conduits for conducting and exhausting a pressure medium adapted to act upon the selecting pistons and which conduits communicate with the valve chamber, motor pistons, conduits connected with the valve chamber for conducting and exhausting the pressure medium when subjected to the action of said motor pistons, common means for setting the selector valve and for selecting one or more of the motor pistons for operation, and means for operating the motor pistons and comprising a manual actuator.

9. In mechanism of the class described, the combination of a gear relation control member, selecting mechanism for causing operation of said member including a plurality of selecting pistons, a valve chamber and a selector valve therein, a casing having conduits for conducting and exhausting a pressure medium adapted to act upon the selecting pistons and which conduits communicate with the valve chamber, motor pistons, conduits connected with the valve chamber for conducting and exhausting the pressure medium when subjected to the action of said motor pistons, common means for setting the selector valve and for selecting one or more of the motor pistons for operation, means for operating the motor pistons comprising a manual actuator, said manual actuator being adapted for operation, and clutch means for connecting a driving element and driven element the gear relations between which are controlled by said gear relation control member.

10. In mechanism of the class described, the combination of a gear relation control member, selecting mechanism for causing operation of said member including a plurality of selecting pistons, a valve chamber and a selector valve therein, a casing having conduits for conducting and exhausting a pressure medium adapted to act upon the selecting pistons and which conduits communicate with the valve chamber, motor pistons, conduits connected with the valve chamber for conducting and exhausting the pressure medium when subjected to the action of said motor pistons, means for operating the motor pistons to cause the pressure medium to operate the selecting pistons under the control of said selector valve, means for setting the selector valve and for selecting one or more of the motor pistons for operation, and a clutch operating lever for actuating the motor piston or pistons when selected.

11. In mechanism of the class described, the combination of a gear relation control member, selecting mechanism for causing operation of said member including a plurality of selecting pistons, a valve chamber and a selector valve therein, a casing having conduits for conducting and exhausting a pressure medium adapted to act upon the selecting pistons and which conduits communicate with the valve chamber, motor pistons, conduits connected with the valve chamber for conducting and exhausting the pressure medium when subjected to the action of said motor pistons, means for operating the motor pistons under the control of said selector valve, means for setting the selector valve and for selecting one or more of the motor pistons for operation, a clutch operating lever for actuating the motor piston, or pistons when selected, and a movement delaying connection between said clutch operating lever and the motor pistons.

12. Operating devices for control mechanisms including a plurality of motor pistons, a manual actuator, a selector for selecting one of said motor pistons for operation, means for setting said selector, and a connection between said main actuator and the selector for actuating the latter to cause selective operation of the motor pistons.

13. Operating devices for control mechanisms including a plurality of motor pistons, a manual actuator, a selector for selecting one or more of said motor pistons for operation, means for setting said selector, and a connection between said main actuator and the seelctor for actuating the latter to cause selective operation of the motor pistons, said connection being so attached to said selector as to permit movement of the actuator independently of the selector.

14. Operating devices for control mechanisms comprising a plurality of motor devices, a selector for rendering operative one or more of said devices, means for setting the selector to engage one or more of said devices, and means for operating the selector to cause operation of selected motor devices after selection has been accomplished by the selector member.

15. Operating devices for contral mechanisms comprising a plurality of motor devices, a selector for rendering operative one of said devices, means for setting the selector, and means for operating the selector to cause operation of selected motor devices after selection has been accomplished by the selector member, said means for operating the selector including a movement delaying connection permitting preliminary movement of the operating means without movement of the selector, and then causing subsequent simultaneous movement of the operating means.

16. Operating devices for control mechanisms including a plurality of motor pistons, a manual actuator, a selector for selecting one of said motor pistons for operation, means for setting said selector, a connection between said main actuator and the selector for actuating the latter to cause selective operation of the motor pistons, a gear relation control member, other selecting mechanism for the latter, a selector valve controlling the action of the last mentioned selecting mechanism and likewise controlling the action of the motor devices, and means whereby said valve is adapted to be set at a selective adjustment simultaneously with the setting of the selector member first mentioned.

17. Operating devices for control mechanisms comprising a plurality of motor devices, a selector for rendering operative one of said devices, means for setting the selector, means for operating the selector to cause operation of selected motor devices after selection has been accomplished by the selector member, said means for operating the selector including a movement delaying connection permitting preliminary movement of the operating means without movement of the selector and then causing subsequent simultaneous movement of the operating means, a gear relation control member, other selecting mechanism for the latter, a selector valve controlling the action of the last mentioned selecting mechanism and likewise controlling the action of the motor devices, and means whereby said valve is adapted to be set at a selective adjustment simultaneously with the setting of the selector member first mentioned.

18. In combination, a plurality of selecting cylinders, a plurality of motor cylinders, selecting and motor pistons in the respective cylinders, a valve chamber, a selector valve in said chamber, conduits connecting the selecting cylinders with the valve chamber and connecting the valve chamber with the motor cylinders whereby a pressure medium may be forced into and out of the valve chamber by operation of the motor pistons and by adjustment of the selector valve so as to establish communication between the said various conduits, a gear relation control device operable by the selecting pistons, a clutch lever, a cross head, a connection between the clutch lever and cross head permitting preliminary movement of the clutch lever independently of the cross head and causing subsequent simultaneous movement of these parts when the clutch lever is actuated, a selector mounted on the cross head and shiftable to render operative one of the motor pistons as an incident to movement of the cross head, and means for setting the selector valve aforesaid common to the selector member for operating the latter.

19. In mechanism of the class described, a shifting member for establishing different gear relations, selecting mechanism including pistons for effecting longitudinal movement of said shifting member in opposite directions, other pistons for effecting lateral movement of said shifting member in opposite directions, and means for causing a pressure medium to act upon said pistons.

20. In mechanism of the class described, a shifting member for establishing different gear relations, selecting mechanism including pistons for effecting longitudinal movement of said shifting member, other pistons for effecting lateral movement of said shifting member, means for causing a pressure medium to act upon said pistons, means slidably supporting the shifting member, and a pivotal axis for the shifting member.

21. In mechanism of the class described, a shifting member for establishing different gear relations, selecting mechanism including pistons for effecting longitudinal movement of said shifting member, other pistons for effecting lateral movement of said shifting member, means for causing a pressure medium to act upon said pistons, a slide supporting the shifting member in the longitudinal movement of the latter, and a pivotal connection intermediate said slide and the shifting member about which axis the shifting member is movable when shifted laterally by certain of the selecting pistons aforesaid.

22. In mechanism of the class described, a shifting member for establishing different gear relations, selecting mechanism for controlling operation of said shifting member including opposing pairs of pistons, means connected with the shifting member operable by said pistons to cause longitudinal movement of the shifting member, a source of supply of a pressure medium, and means for directing the pressure medium against the said pistons in such a manner as to exert pressure on one opposing piston while relieving pressure on the other, and in such a manner as to exert equal pressure on all of the pistons, whereby to obtain different adjustments of the shifting member.

23. In mechanism of the class described, a shifting member for establishing different gear relations, selecting mechanism for controlling operation of said shifting member including opposing pairs of pistons disposed longitudinally of the shifting member for controlling a longitudinal movement of the latter, means connected with the shifting member operable by said pistons to cause longitudinal movement of the shifting member, a source of supply of a pressure medium, means for directing the pressure medium against the said pistons in such a manner as to exert pressure on one opposing piston while relieving pressure on the other, and in such a manner as to exert equal pressure on all of the pistons, whereby to obtain different adjustment of the shifting member, and other pistons operable in opposite directions by said pressure medium and adapted to coact with the shifting member to move the same laterally.

24. In mechanism of the class described, a shifting member for establishing different gear relations, selecting mechanism for controlling operation of said shifting member including opposing pairs of pistons disposed longitudinally of the shifting member for controlling a longitudinal movement of the latter, means connected with the shifting member operable by said pistons to cause longitudinal movement of the shifting member, a source of supply of a pressure medium, means for directing the pressure medium against the said pistons in such a manner as to exert pressure on one opposing piston while relieving pressure on the other, and in such manner as to exert equal pressure on all of the pistons, whereby to obtain different adjustments of the shifting member, other pistons operable in opposite directions by said pressure medium and adapted to coact with the shifting member to move the same laterally, and means to control the action of the pressure medium upon the last mentioned pistons so as to exert pressure upon one piston while relieving pressure on the other and so as to exert equal pressures upon the pistons whereby to position the shifting member differentially.

25. In mechanism of the class described, the combination of a shifting member operable to establish different gear relations, pressure operated devices coacting with said shifting member to move the same longitudinally and laterally, and means for controlling the action of the pressure medium upon said pressure operated devices to cause combined longitudinal and lateral movements of the shifting member.

26. In mechanism of the class described, the combination of a shifting member operable to establish different gear relations, pressure operated devices coacting with said shifting member to move the same longitudinally and laterally, and means for controlling the action of the pressure medium upon said pressure operated devices to cause combined longitudinal and lateral movements of the shifting member and to cause a balancing of forces adapted to be exerted by the pressure operated devices whereby to position the shifting member at an adjustment intermediate its extremes of longitudinal and lateral movement.

27. In mechanism of the class described, the combination of a shifting member for establishing different gear relations, fluid operated devices adapted to act upon said member to shift it longitudinally, other fluid operated devices acting upon said member to shift it laterally, means for conducting a fluid pressure medium to said fluid operated devices in such a manner as to act upon both of the sets of fluid operated devices individually and collectively whereby to effect combinations of longitudinal and lateral movements of the shifting member and whereby to position said shifting member at a point intermediate its extremes of longitudinal movement and its extremes of lateral movement.

28. In mechanism of the class described, the combination of a shifting member for establishing different gear relations, selecting mechanism for causing different movements of said shifting member and comprising a plurality of pressure operated devices for moving the shifting member in different directions, conduits for conducting a pressure medium to said pressure operated devices, means for controlling the passage of the pressure medium through said conduits comprising a selector valve, and a valve chamber inclosing said selector valve, the selector valve comprising a hollow structure dividing the valve chamber into a main chamber at one side of the valve and an auxiliary chamber at the other side of the valve, the said conduits being so connected with the valve chamber aforesaid that communication between certain conduits is established from the main portion of the valve chamber and communication between other conduits is established by the auxiliary valve chamber.

29. In mechanism of the class described, the combination of a shifting member for establishing different gear relations, selecting mechanism for causing different movements of said shifting member and comprising a plurality of pressure operated devices for moving the shifting member in different directions, conduits for conducting a pressure medium to said pressure operated devices, means for controlling the passage of the pressure medium through said conduits comprising a selector valve, and a valve chamber inclosing said selector valve, the selector valve comprising a hollow structure dividing the valve chamber into a main chamber at one side of the valve and an auxiliary chamber at the other side of the valve, the said conduits being so connected with the valve chamber aforesaid that communication between certain conduits is established from the main portion of the valve chamber and communication between other conduits is established by the auxiliary valve chamber, said valve being provided with a port therethrough for conducting a pressure medium into the main valve chamber without permitting the pressure medium to enter the auxiliary valve chamber.

30. In mechanism of the class described, the combination of a shifting member for establishing different gear relations, selecting mechanism comprising a plurality of cylinders, pistons arranged in said cylinders and adapted to effect movement of the shifting member in one direction, a second plurality of cylinders, pistons operating in the last mentioned cylinders and adapted to effect movement of the shifting member in another direction, a casing, a valve chamber, conduits in the casing connecting the various cylinders with the valve chamber, and a valve in said valve chamber constructed so as to connect certain of the conduits whereby to cause a pressure medium passing therethrough to exert and relieve pressure in respect to the pistons of the first plurality of cylinders mentioned, and to connect other conduits so as to cause a pressure medium passing therethrough to exert and relieve pressure upon the pistons of the second plurality of cylinders above mentioned, and means for adjusting said valve to vary the connections of the conduits aforesaid.

31. In mechanism of the class described, the combination of a shifting member for establishing different gear relations, selecting mechanism comprising a plurality of cylinders, pistons arranged in said cylinders and adapted to effect movement of the shifting member in one direction, a second plurality of cylinders, pistons operating in the last mentioned cylinders and adapted to effect movement of the shifting member in another direction, a casing, a valve chamber, conduits in the casing connecting the various cylinders with the valve chamber, a valve in said valve chamber constructed so as to connect certain of the conduits whereby to cause a pressure medium passing therethrough to exert and relieve pressure in respect to the pistons of the first plurality of cylinders mentioned, and to connect other conduits so as to cause a pressure medium passing therethrough to exert and relieve pressure upon the pistons of the second plurality of cylinders above mentioned, and means for adjusting said valve to vary the connections of the conduits aforesaid, the valve being hollow and providing therein an auxiliary valve chamber separated from the main chamber in which the valve is disposed, and said conduits being so arranged that certain of them may be covered by the valve and communication established therebetween within said auxiliary valve chamber while at the same time communication is established between other of the conduits not covered by the valve by means of the space within the main valve chamber exterior to the valve.

32. In mechanism of the class described, the combination of a shifting member for establishing different gear relations, selecting mechanism comprising a plurality of cylinders, pistons arranged in said cylinders and adapted to effect movement of the shifting member in one direction, a second plurality of cylinders, pistons operating in the last mentioned cylinders and adapted to effect movement of the shifting member in another direction, a casing, a valve chamber, conduits in the casing connecting the various cylinders with the valve chamber, a valve in said valve chamber constructed so as to connect certain of the conduits whereby to cause a pressure medium passing therethrough to exert and relieve pressure in respect to the pistons of the first plurality of cylinders mentioned, and to connect other conduits so as to cause a pressure medium passing therethrough to exert and relieve pressure upon the pistons of the second plurality of cylinders above mentioned, means for adjusting said valve to vary the connections of the conduits aforesaid, the valve being hollow and providing therein an auxiliary valve chamber separated from the main chamber in which the valve is disposed, and said conduits being so connected with the main valve chamber that certain of them may be covered by the valve and communication established therebetween within said auxiliary valve chamber while at the same time communication is established between other of the conduits not covered by the valve by means of the space within the main valve chamber exterior to the valve, and pressure medium inlet conduits connected with the main valve chamber and adapted to be covered or uncovered by said valve.

33. In mechanism of the class described, the combination of a shifting member for establishing different gear relations, selecting mechanism comprising a plurality of cylinders, pistons arranged in said cylinders and adapted to effect movement of the shifting member in one direction, a second plurality of cylinders, pistons operating in the last mentioned cylinders and adapted to effect movement of the shifting member in another direction, a casing, a valve chamber, conduits in the casing connecting the various cylinders with the valve chamber, a valve in said valve chamber constructed so as to connect certain of the conduits whereby to cause a pressure medium passing therethrough to exert and relieve pressure in respect to the pistons of the first plurality of cylinders mentioned, and to connect other conduits so as to cause a pressure medium passing therethrough to exert and relieve pressure upon the pistons of the second plurality of cylinders above mentioned, means for adjusting said valve to vary the connections of the conduits aforesaid, the valve being hollow and providing therein an auxiliary valve chamber separated from the main chamber in which the valve is disposed, and said conduits being so connected with the main valve chamber that certain of them may be covered by the valve and communication established therebetween within said auxiliary valve chamber while at the same time communication is established between other of the conduits not covered by the valve by means of the space within the main valve chamber exterior to the valve, and pressure medium inlet conduits connected with the main valve chamber and adapted to be covered or uncovered by said valve, the said valve being provided with ports leading therethrough and separated from the auxiliary valve chamber of the valve, the last mentioned ports being susceptible of adjustment to establish communication with the conduits aforesaid whereby a pressure medium in said conduits may exhaust therefrom or enter the same by passing through the valve.

34. In change speed mechanism, the combination of gear shifting means operable to establish different gear relations, a plurality of pressure devices to actuate said means, a single selector device common to all of said pressure devices and adapted for variable adjustment to control their action for effecting gear transitions to establish various gear relations, a source of supply of a pressure medium with connections therefrom leading to the pressure devices, said connections being controlled by the said single selector device, and a clutch operating device effective to cause the pressure medium to pass through said connections.

In testimony whereof I affix my signature.

LAURITS A. LAURSEN.